United States Patent [19]
Metcalf et al.

[11] Patent Number: 5,244,685
[45] Date of Patent: Sep. 14, 1993

[54] SYSTEM AND METHOD FOR PRODUCING APPLESAUCE

[75] Inventors: John Metcalf; Raymond E. Camezon, both of Danville, Calif.

[73] Assignee: California Processing Machinery, Danville, Calif.

[21] Appl. No.: 919,212

[22] Filed: Jul. 24, 1992

[51] Int. Cl.$^5$ .................. A23L 1/00; A23N 15/00
[52] U.S. Cl. ......................... 426/481; 99/483; 99/484; 99/510; 426/521; 426/615
[58] Field of Search ............... 426/481, 482, 518, 521, 426/615; 99/483, 484, 510, 540

[56] References Cited

U.S. PATENT DOCUMENTS 3,829,931  8/1974  Suerbaum .................. 452/138
4,022,922  5/1977  Nelson ...................... 426/481
5,007,334  4/1991  Kobes et al. ................ 99/483

Primary Examiner—George Yeung
Attorney, Agent, or Firm—Bielen, Peterson & Lampe

[57] ABSTRACT

An apparatus and method for producing applesauce utilizing unpeeled apples that have been cored or reamed on the stem and blossom ends. The apples are divided into portions and pumped into a heater which raises the temperature of the portions of the apple to approximately 71°–73° C. A finisher then separates the waste parts from the flesh of the apple portions. The apple flesh is pulped and pumped to a second heater which raises the temperature to approximately 90°–104° C. The applesauce product then travels through a dwell line to an expansion chamber for collection.

14 Claims, 2 Drawing Sheets

SYSTEM AND METHOD FOR PRODUCING APPLESAUCE

BACKGROUND OF THE INVENTION

The present invention relates to a novel apparatus and method for producing applesauce from unpeeled apples, which have been cored or reamed at the stem and blossom end.

Applesauce is conventionally produced by first completely or partially peeling apples by any of a number of methods. For example, a portion of the apples may be "barber poled", i.e.: where only a portion of the peel is removed. The apples are then cored to remove the seeds as well as the stem and blossom ends. The remaining pieces of apples are then divided and cooked to about 200° F. The conventional method is very expensive since total or "barber pole" peeling prior to the pulping and cooking process is a intricate and time consuming step. Further, coring of the apple wastes a good deal of the usable flesh of the apple. In addition, red varieties of apples tend to transfer color from the peel to the flesh of the apple during the cooking process. Such color transfer carries through to the finished product and often results in downgrading of the finished applesauce. Oxidation also occurs during the peeling step in the prior art process, which causes discoloration the flesh and permits the escape of vitamin C. Later addition of ascorbic acid to the applesauce in the prior art process compensates for vitamin C loss, but also causes a disagreeable change in the flavor of the applesauce. Finally, the prior art process is relatively labor intensive in its operation, particularly, in the maintenance required for the necessary equipment.

The prior art process also produces a applesauce which is often not fresh because of the long residence time during the cooking process. In addition, a vacuum system is used in the prior art which tends to remove the essences from the applesauce, which affects to palatable qualities of the same. Such vacuum system necessitates the addition of water to the finished product, a time consuming and costly step.

Reference, is made to U.S. Pat. No. 5,007,334 which describes an apparatus which is usable in the manufacture of applesauce. The subject patent teaches employment of a device found in U.S. Pat. No. 3,829,931 which uses a rotating perforated drum to separate the stem seeds and skin from the meat of an apple. The pulp produced in the separating apparatus is subsequently rapidly heated to prevent enzymatic discoloration. Unfortunately, the color transfer between the skin and meat of apples, which is especially acute in certain red grades of apples, is not solved by this process since heat is only applied after isolation of the apple flesh. In addition, the apparatus described in U.S. Pat. No. 3,829,931 is extremely expensive to purchase, operate, and maintain in an applesauce production process.

An apparatus and process for making applesauce which eliminates peeling, prevents color transfer from red varieties apples, and produces grade A applesauce efficiently and inexpensively, would be a notable advance in the food processing industry.

SUMMARY OF THE INVENTION

In accordance with the present invention a novel and useful apparatus and process for producing applesauce is herein provided.

The process of the present invention utilizes a reaming mechanism which removes the stem and blossom ends from raw apples. Preferably, such device reams only the stem and blossom portions of the apple leaving the core behind. However, coring may be employed in this step if it is performed efficiently without excessive loss of product. The unpeeled apples are then divided into portions by means of a dicer or other suitable machinery. Preferably, the divided portions of the apple each possess a largest dimension between 0.5 and 1.0 centimeters. Such divided portions may be rectangular, circular, or other three dimensional shapes. In any case, the divided portions of the apples are immediately pumpable or movable to a first heater which raises the temperature of the divided portions of the apples to approximately 71°–73° C., which is sufficient to prevent oxidation of the apple flesh and prevent color transfer between the peel and flesh of the apple. At this point in the process of the present invention, the apple portions enter a substantially closed system.

The divided portions of the apple are then transferred to means for separating the flesh from the skin of the divided portions. Such means may take the form of an apparatus known as a "finisher", which is a commercially available device. The finisher removes the flesh from the s kin and carpel/core matter, and essentially pulps the flesh. The temperature imparted by the first heater is sufficiently maintained in the finishing operation to retard oxidation and color transfer.

After discarding the peels and core portions of the apple, the pulp is put into a second heater which rapidly raises the temperature of the pulp sufficiently to cook or pasteurize the pulp. Normally, such temperature is approximately 90°–104° C.

After leaving the second heater, the applesauce is sent to a static mixer, through a dwell line, and, subsequently, to an expansion chamber. Gases emanating from the expansion chamber are recycled to the finisher, while the finished product from the expansion chamber is transferred to a conventional filling operation. Such filling operation may include the admixing of additives such as cinnamon.

It may apparent that a novel and useful apparatus and process for producing applesauce has been described.

It is an object of the present invention to provide an apparatus and process for producing applesauce which eliminates mechanisms for totally or partially peeling raw apples.

It is another object of the present invention to provide an apparatus and process for producing applesauce which efficiently removes the undesirable stem and blossom portions of a raw apple after dividing and heating of the flesh and peel portions of a apple.

It is a further object of the present to provide an apparatus and process for producing applesauce which is very cost effective and yet produces grade "A" applesauce.

Yet another object of the present invention is to provide an apparatus and process for producing applesauce which eliminates color transfer problems between the skin and flesh of red varieties of apples and prevents oxidation of the flesh portion of the apples.

Another object of the present invention is to provide an apparatus and process for producing applesauce which utilizes relatively high temperatures and short residence times within the components of the same.

Another object of the present invention is to provide an apparatus and process for producing applesauce which eliminates labor and maintenance efforts needed in the prior art applesauce production systems.

The invention possesses other objects and advantages especially as concerns particular characteristics and features thereof which will become apparent as the specification continues.

Figure 1:
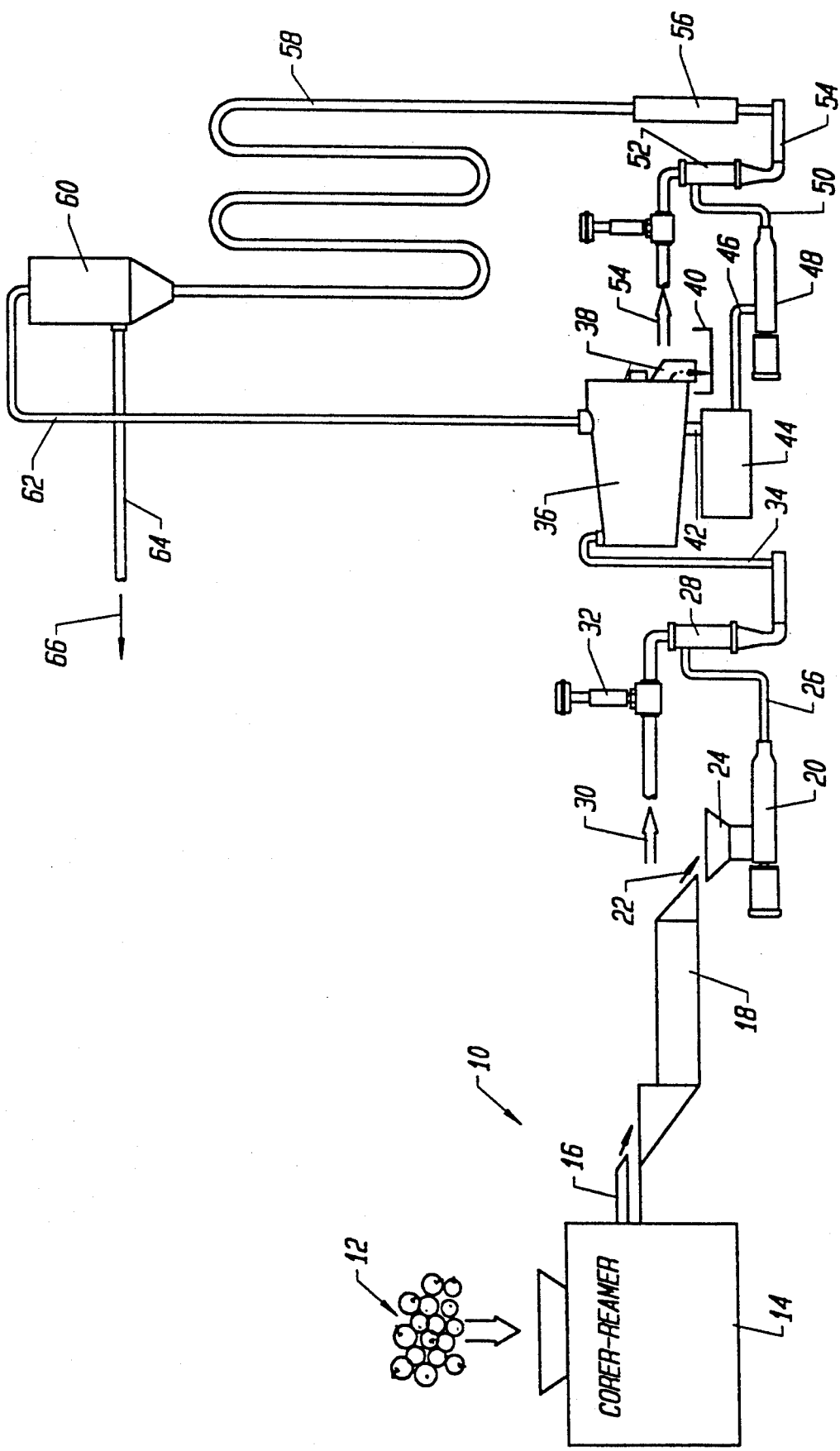
FIG. 1 is overall schematic view of the process and apparatus of the present invention.

For a better understanding of the invention reference is made to the following detailed description of the preferred embodiments which should be referenced to the hereinabove described drawings.

DESCRIPTION OF THE PREFERRED EMBODIMENTS

Various aspects of the present invention will evolve from the following detailed description of the preferred embodiments thereof which should be taken in conjunction with the prior delineated drawings.

The apparatus as a whole is depicted in the drawings by reference character 10. Apparatus 10 is particularly useful in processing apples for the production of applesauce.

A plurality of apples 12 are fed to means 14 for removing at least the blossom end of the raw apples. Apple varieties may include Macintosh (Mac), Baldwin, Golden, Delicious, Jonathan, Granny, Greening, Rome Beauty, York Imperial, Winesap, Stayman, Northern Spy and others. In particular red varieties of apples, such as Law Rome, Red Delicious and the like, which are notoriously difficult to process into applesauce, may also be employed in the present process since the color transfer problem has effectively been solved.

Means 14 may take the form of a coring device, known in the art, or a reaming mechanism disclosed in co-pending application Ser. No. 07/729,622, now issued as U.S. Pat. No. 5,181,459. In the latter mechanism, a notable saving is achieved in the recovery of the meat of the apples over the prior coring devices. It should be noted that the apples are not peeled in coring or reaming means 14.

Cored or reamed apples exiting means 14 are then passed through outlet 16 to means 18 for dividing each of the apples into certain portions. Means 18 may take the form of a dicer such as a model GH, manufactured by Urschel Laboratories, of Valparaiso, Ind. Typically, dicer 18 divides apples received therein to angulated or cube-like portions having a side dimension ranging between 0.6 to 1.3 centimeters. It should be noted that such apple portions retain the peels.

The diced or divided apple portions are then sent to pump 20, directional arrow 22, through hopper 24. Since pump 20 may take the form of a Moyno, Model F-66, manufactured by Robins & Myers, Inc. of Springfield, Ohio. Hopper 24 marks the beginning of a substantially closed system in the process of producing applesauce. In certain cases e.g.: with dry apples, water may be added to hopper 24 to control viscosity.

The apple portions are then forced through conduit 26 into heater/cooker 28 which is driven by a steam source 30 which controlled by automatic valve means 32. The apple portions are heated to approximately 71°–73° C. within a short period of time. This rapid heating in cooker 28 is believed to prevent color transfer between the peels of the apples portions and the meat of the apple portions. Heater 28 may be a model SC25-3 manufactured by Pick Heaters Inc. of West Bend, Wis.

Conduit 3 transfers the heated apple portions to finisher 36. Finisher 36 may take the form of a Model A manufactured by Langsenkamp Co. of Indianapolis, Ind. The apple portions are pushed through screens within finisher 38 to separate the undesirable portions of the apple, such as the stem and blossom ends, carpel, and the like, from the pulped flesh. The former exits finisher 36 through waste outlet 38 and enters waste conveyor 40. Apple waste from waster conveyor 40 may be further processed through a second finisher to further recover apple flesh. The pulped flesh passes through outlet 42 into air-tight tank 44.

Conduit 46 carries the pulp from air-tight tank 44 to pump 48 which may be a Moyno model F-6, available from Robins & Myers, Inc of Springfield, Ohio. From pump 48, conduit 50 directs the pulp to a second heater 52 having steam source 54. Heater 52 may be a model SC10-3 manufactured by Pick Heaters, Inc. of West Bend, Wis. Moreover, the pulp temperature is raised to approximately 90°–104° C. which essentially pasteurizes the applesauce and commensurate with the filling step, which will be hereinafter described.

Conduit 54 carries the pasteurized applesauce to static mixer 56, such as helical or divided blade type, manufactured by Koch Static Mixing Group, Wichita, Kan. After static mixer 56, the applesauce travels through a dwell line 58 which completes the mixing of product and steam and also serves to control the color of the applesauce. Dwell line 58 is shown as being S-shaped and involving the movement of the applesauce therewithin upwardly to expansion chamber 60. Conduit 62 recycles gases from expansion chamber to the top gas inlet of finisher 36. Conduit 64 passes the finished applesauce product to a filling apparatus known in the art, directional arrow 66.

The resulting applesauce is of superior quality, in essence, aroma, taste, and color.

Most notably, the system 10 eliminates the need for peelers which are expensive to operate and are a source of color transfer between the peel and meat especially prevalent when processing red variety of apples.

The invention is illustrated by the following examples of certain preferred embodiments thereof, although it will be understood that the invention is not limited thereby.

EXAMPLE I

A comparison test was performed producing applesauce by the conventional method involving peeling of apples and the process of the present invention. The conventional process of applesauce was run at a rate approximately 14,000 lbs. per hour, while the process of the present invention was run at approximately 8,000 lbs per hour. The comparison runs were performed over a period of approximately 3 hours using cored, rather than reamed, Greening, Rome, Golden, and York varieties of apples. The degree of Brix wa determined by the use of a refractometer. The applesauce analysis was conducted immediately after production of the applesauce and is rated on a scale of 0–20. It may be observed from the following table, the process of the present invention produced applesauce of grade "A" quality in almost all instances and of a quality which was comparable to the conventional process involving the peeling raw of apples. Table 1 represents results of the parallel applesauce production of Example I.

TABLE I

| | | | APPLESAUCE ANALYSIS | | | | | |
|---|---|---|---|---|---|---|---|---|
| RUN | BRIX | COLOR | CONSIST. | FINISH | FREE OF DEFECTS | DK DEF | LGHT DEF | BLOSSOM ENDS |
| PROCESS OF PRESENT INVENTION | | | | | | | | |
| 1 | 13.0 | 19 | 18 | 18 | 18 | 2 | 5 | 0 |
| 2 | 10.0 | 19 | 18 | 18 | 18 | 1 | 6 | 0 |
| 3 | 12.0 | 18 | 18 | 18 | 18 | 1 | 6 | 1 |
| 4 | 11.0 | 18 | 18 | 1S | 17.5 | 0 | 7 | 2 |
| 5 | 11.8 | 19 | 18 | 18 | 19 | 0 | 4 | 0 |
| CONVENTIONAL PROCESS | | | | | | | | |
| 6 | 11.0 | 19 | 18 | 18 | 19 | 1 | 4 | 0 |
| 7 | 11.0 | 19 | 18 | 18 | 18 | 0 | 7 | 1 |
| 8 | 12.0 | 18 | 18 | 18 | 17.5 | 1 | 7 | 1 |
| 9 | 11.0 | 18 | 18 | 18 | 18 | 1 | 6 | 0 |
| 10 | 12.0 | 18 | 18 | 18 | 19 | 1 | 4 | 0 |

"Brix" refers to the percent, by weight, of natural apple soluble solids and added sweetener, if any, corrected to 20° C. (68° F.), where grade "A" and "B" are not less than 9.0° (unsweetened).

"Color" refers to visual appearance and is rated on a scale of 0–20 points where grade "A" is 18 to 20 points (bright), grade "B", is 16 to 17 points (slightly brown, pink or grey) and sub-standard 0 to 15 points.

"Consistency" refers to the flowability of the product and degree of separation of free liquid, and is measured on a scale of 0–20 points, where grade "A" is 18 to 20 points (product flow less than 6.5 cm/inch), grade "B" is 16–17 points (product flow less than 8.5 cm/inch), and sub-standard is 0–15 points.

"Finish" refers to the texture and tenderness of the apple particles, the evenness of the division of apple particles in regular or comminuted style, and the proportion of chunks or pieces of apples in relation to fine apple particles in chunk styles. "Finish" is rated on a scale of 0–20 where grade A (high portion of apple chunks) is 18–20 points, grade B (fairly high portion of apple chunks) is 16–17 points, and substandard is 0–15 points.

"Free of defects" means the degree of freedom from particles of seeds, discolored apple particles, peel, carpel tissue (tissue surrounding seed cavity), stamens (dark hairlike substance from blossom and of apple; i.e.: "flylegs" and other objectionable particles. Grad "A" is less than eight (8) particles per gallon of a dark, light or blossom end type and is assigned 18-20 points. Greater than eight (8) particles is grade B or less. "Dark defects" (DK DEF) included red peel, rot and scales. "Light defects" (LGHT DEF) included yellow peel, and carpel.

EXAMPLE II

A more extensive applesauce production test was conducted over a 11 day period utilizing cored apples in conditions rated bad to fair. Again, the blend of apples included Rome apples, normally considered the most difficult apples to process into applesauce because of the dark red color of the skin. Again, on certain days, applesauce was produced by the conventional process involving peeling of the apples, while on the majority of the days of the process of the present invention was employed. The quality of the applesauce was rated accordingly to the system employed in Example I hereinabove. Table II represents the results from the test conducted in Example II.

TABLE II

| DAY | PROCESS | COLOR | CONSIST | FINISH | DEF. | BLEND | APPLE CONDITION |
|---|---|---|---|---|---|---|---|
| 1 | Present Appln. | 18.0 | 19.0 | 18.0 | 18.5 | 70% Rome 30% Macint. & Granny | Fair |
| 2 | Convent. | 17.5 | 18.0 | 18.0 | 17.3 | 60% Rome & 40% Golden & Granny | Fair |
| 3 | Convent. | 19.0 | 19.0 | 19.0 | 17.8 | 60% Rome & 40% Golden & Granny | Fair |
| 4 | Present Appln. | 17.5 | 17.8 | 18.0 | 17.1 | 75% Rome & 25% York, Golden, Granny | Fair |
| 5 | Present | 17.9 | 18.0 | 18.0 | 18.5 | 70% Rome 30% York, Golden & Granny | Bad |
| 6 | Convent. | 17.5 | 18.5 | 18.3 | 18.6 | 75% Rome & 25% Golden & York | Fair |
| 7 | Present Appln. | 17.5 | 18.0 | 17.8 | 18.0 | 75% Rome & 25% York, Mac. & Granny | Fair |
| 8 | Present Appln. | 18.0 | 18.0 | 18.0 | 18.5 | 75% Rome & 25% York & Macintosh | Bad |
| 9 | Present Appln. | 18.0 | 18.0 | 18.0 | 18.3 | 75% Rome & 25% Macint. | Fair |
| 10 | Present | 18.0 | 18.0 | 18.0 | 18.9 | 80% Rome & | Fair to Bad |

TABLE II-continued

| DAY | PROCESS | COLOR | CONSIST | FINISH | DEF. | BLEND | APPLE CONDITION |
|---|---|---|---|---|---|---|---|
| 11 | Appln. Present Appln. | 18.0 | 18.0 | 18.0 | 18.3 | 25% Macint. 60% Rome & 40% Macintosh, Gold. & Red Delic. | Fair to Bad |
| 12 | Present Appln. | 18.2 | 18.1 | 18.0 | 18.4 | 60% Rome & 40% Macintosh & Golden | Fair |

The average fruit size in the above runs of Table II ranged between 2½ inches and 2⅝ inches in diameter, on the average. The conventional process run of Days 2, 3, and 6 required use of 4–6 peeling machines. Needless to say, the process of the present invention required no peeling machines. On the average, manual laborers for sorting and trimming averaged 6.6 per day for the conventional system while the system of the present invention utilized 5.8 sorting and trimming personnel.

Figure 2:
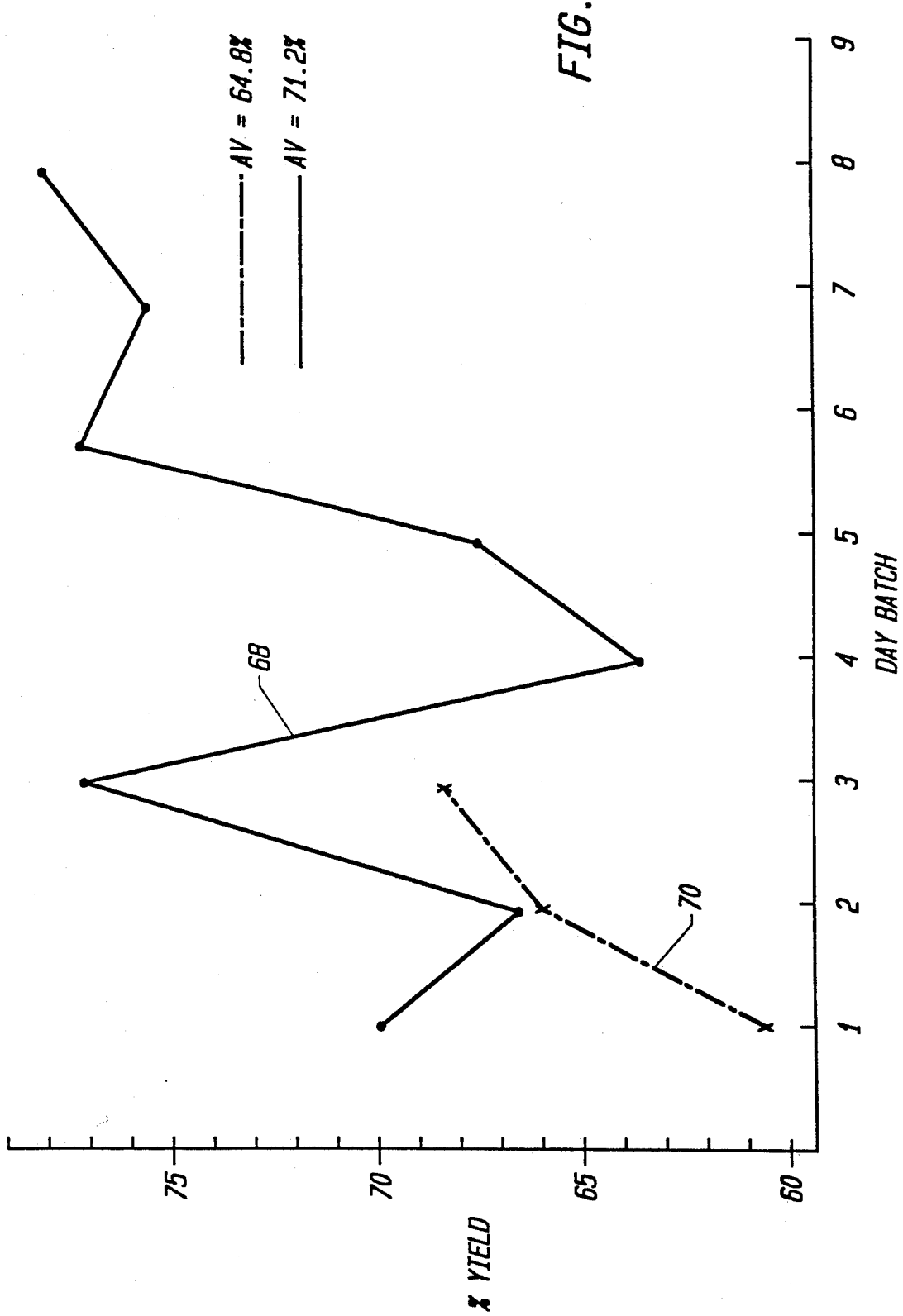
FIG. 2 is a graphical representation of relative yields of the processes described in Example II.

With reference to FIG. 2, the yield line 68 represents yields of apples which resulted from the method of the present invention. Dashed line 70 represents the yields obtained using a conventional system. It should be noted that FIG. 2 also reveals the higher average yield obtained by the system of the present invention.

While in foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A system for producing applesauce utilizing raw apples having at least the blossom end of each of the raw apples removed, comprising;
    a. means for dividing each of the apples into portions;
    b. a first heater, said heater including a chamber, said chamber being capable of containing the divided portions of apples; said first heater imparting heat to the divided portions of apples sufficient to substantially prevent color transfer between the skin and the flesh of the divided portions of the apples;
    c. means for separating the flesh from the skin of the divided portions of the apples after containment by said first heater;
    d. means for pulping the flesh of the divided portions of the apples; and
    e. a second heater, said second heater imparting heat to the pulped flesh of the divided portions of the apples sufficient to cook the pulped flesh of the divided portions of the apple.

2. The system of claim I in which said second heater employs a steam medium and said system further comprises an expansion chamber for the applesauce and steam exiting said second heater.

3. The system of claim 2 which further comprises means for directing steam from said expansion chamber to said means for pulping the flesh of the divided portions of the apples.

4. The system of claim 3 which further comprises means for removing the applesauce from said expansion chambers.

5. The system of claim 1 which further comprises pump means for transporting the divided portions of apples to said first heater.

6. The system of claim 5 which further comprises pump means for transporting the pulped flesh of the divided portions of the apples to said second heater.

7. The system of claim 1 which additionally comprises a waste conveyor for removing the skin of the divided apple portions from said means for separating the flesh from the skin of the divided portions of the apples.

8. The system of claim 1 which further comprises a dwell line and connected expansion chamber, said dwell line being interposed said second heater and said expansion chamber.

9. The system of claim 8 in which said expansion chamber is positioned at a higher level than said second heater.

10. The system of claim 8 which additionally comprises means for returning vapors from said expansion chamber to said means for pulping the flesh of the divided portions of the apples.

11. A process for producing applesauce from raw apples having at least the blossom ends of each of the raw apples removed, comprising the steps of;
    a. dividing each of the apples into portions;
    b. initially heating the divided portions of apples sufficient to substantially prevent color transfer between the skin and flesh of the divided portions of the apples;
    c. separating the flesh from the skin of the divided portions of the apples after said initial heating;
    d. pulping the flesh of the divided portions of the apples; and
    e. subsequently heating the pulped flesh of the divided portions of the apples sufficient to cook the pulped flesh of the divided portions of the apples.

12. The process of claim 11 in which said subsequent heating raises the temperature of the pulped flesh of the divided portions of the apples to a higher temperature than the divided portions of the apples heated by said initial heating step.

13. The process of claim 11 which further includes the step of passing said heated pulped flesh of the divided portions of the apples to an expansion chamber through a dwell line.

14. The process of claim 13 which further includes the step of directing gases from said expansion chamber to said pulped flesh of the divided portions of the apples.

* * * * *